United States Patent
Inayama

(10) Patent No.: US 9,725,353 B2
(45) Date of Patent: Aug. 8, 2017

(54) LASER FUSION-CUTTING METHOD FOR PLATE GLASS

(71) Applicant: Nippon Electric Glass Co., Ltd., Shiga (JP)

(72) Inventor: Naotoshi Inayama, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/441,348

(22) PCT Filed: Oct. 11, 2013

(86) PCT No.: PCT/JP2013/077760
§ 371 (c)(1),
(2) Date: May 7, 2015

(87) PCT Pub. No.: WO2014/077066
PCT Pub. Date: May 22, 2014

(65) Prior Publication Data
US 2015/0307386 A1 Oct. 29, 2015

(30) Foreign Application Priority Data

Nov. 13, 2012 (JP) ................. 2012-249309

(51) Int. Cl.
*C03B 33/08* (2006.01)
*B23K 26/14* (2014.01)
(Continued)

(52) U.S. Cl.
CPC ............ *C03B 33/082* (2013.01); *B23K 26/00* (2013.01); *B23K 26/14* (2013.01);
(Continued)

(58) Field of Classification Search
CPC ........ B23K 26/14; B23K 26/38; B23K 26/00; B23K 26/1452; B23K 26/407;
(Continued)

(56) References Cited

U.S. PATENT DOCUMENTS 4,711,056 A * 12/1987 Herrington ............. B24C 1/045
451/102
4,942,284 A 7/1990 Etcheparre et al.
(Continued)

FOREIGN PATENT DOCUMENTS

EP 0 330 565 8/1989
JP 61-9990 1/1986
(Continued)

OTHER PUBLICATIONS

Machine translation of JP 8141764, Matsumoto et al., Laser Beam Cutting Method, Jun. 1996.*
(Continued)

*Primary Examiner* — Queenie Dehghan
(74) *Attorney, Agent, or Firm* — Wenderoth, Lind & Ponack, L.L.P.

(57) ABSTRACT

Provided is a laser fusing method for a glass sheet, including: cutting the glass sheet (G) by irradiating the glass sheet (G) with a laser (L) from a front surface (S) side thereof along a preset cutting line (X) extending in a surface direction of the glass sheet (G); and jetting a shaping gas (A3) so as to form a flow along at least one of the front surface (S) and a back surface (B) of the glass sheet (G), the shaping gas (A3) passing through an irradiation portion (C) of the laser (L).

8 Claims, 5 Drawing Sheets

(51) Int. Cl.
  *B23K 26/38* (2014.01)
  *B23K 26/00* (2014.01)
  *B23K 26/40* (2014.01)
  *C03B 33/02* (2006.01)
  *B23K 103/00* (2006.01)

(52) U.S. Cl.
  CPC .......... *B23K 26/1438* (2015.10); *B23K 26/38* (2013.01); *B23K 26/40* (2013.01); *C03B 33/02* (2013.01); *C03B 33/08* (2013.01); *B23K 2203/50* (2015.10)

(58) Field of Classification Search
  CPC   B23K 26/40; B23K 26/1438; B23K 2203/50; C03B 33/082; C03B 33/08; C03B 33/02
  See application file for complete search history.

(56) References Cited

U.S. PATENT DOCUMENTS

| | | | | |
|---|---|---|---|---|
| 5,770,833 A * | 6/1998 | Kanaoka | ............ | B23K 26/1476 219/121.67 |
| 6,649,867 B2 * | 11/2003 | Rippl | ..................... | B23K 26/14 219/121.63 |
| 8,093,532 B2 * | 1/2012 | O'Brien | ................. | B23K 26/16 219/121.69 |
| 2012/0047957 A1 * | 3/2012 | Dannoux | .............. | C03B 33/091 65/112 |
| 2013/0122264 A1 | 5/2013 | Fujii et al. | | |
| 2015/0299019 A1 * | 10/2015 | Fujii | ................... | C03B 33/0235 65/53 |

FOREIGN PATENT DOCUMENTS

| | | |
|---|---|---|
| JP | 61-20684 | 1/1986 |
| JP | 62-151091 | 9/1987 |
| JP | 8-141764 | 6/1996 |
| JP | 2001-212690 | 8/2001 |
| JP | 2007-319893 | 12/2007 |
| JP | 2012-143814 | 8/2012 |
| JP | 2013-75818 | 4/2013 |

OTHER PUBLICATIONS

International Search Report issued Nov. 12, 2013 in International (PCT) Application No. PCT/JP2013/077760.

International Preliminary Report on Patentability and Written Opinion of the International Searching Authority issued May 19, 2015 in International (PCT) Application No. PCT/JP2013/077760.

The Extended European Search Report issued Sep. 7, 2016 in corresponding European Application No. 13854446.5.

* cited by examiner

LASER FUSION-CUTTING METHOD FOR PLATE GLASS

TECHNICAL FIELD

The present invention relates to a laser fusing method for a glass sheet, which involves cutting the glass sheet by irradiating the glass sheet with a laser along a preset cutting line and removing molten glass generated by melting the glass sheet through heating with the laser.

BACKGROUND ART

As is well known, in a process of manufacturing glass sheet products to be used for flat panel displays (FPD) such as a liquid crystal display, a plasma display, an electroluminescence display, and an organic light-emitting diode display, and for solar cells, a small-area glass sheet is cut out of a large-area glass sheet, and an edge portion extending along each side of the glass sheet is trimmed off.

A laser fusing method is publicly known as a method of cutting a glass sheet as described above. In Patent Literature 1, one example of the laser fusing method is disclosed. The laser fusing method involves cutting an object to be processed, which is as an object to be cut, by irradiating the object to be processed with a laser along a preset cutting line extending in a surface direction of the object to be processed and removing a portion molten through heating with the laser by, for example, jetting an assist gas.

When the laser fusing method is applied for cutting the glass sheet, a cutting end portion of each piece of the cut glass sheet is formed so as to have a smooth fire polished surface. As a result, the same effect as or a higher effect than that of polishing for a mirror-smooth surface, which is carried out by a mechanical method, can be exerted on the cutting end portion.

CITATION LIST

Patent Literature 1: JP 08-141764 A

SUMMARY OF INVENTION

Technical Problem

However, even such a laser fusing method having an excellent characteristic as described above still has a problem to be solved. Note that, in the following description, of the front and back surfaces of the glass sheet, the surface irradiated with a laser is referred to as "front surface," and the surface opposite to the "front surface" is referred to as "back surface."

That is, when the glass sheet is cut by the laser fusing method, it is significantly difficult to adjust, for example, the output power of a laser to be radiated to the glass sheet and the jetting pressure of an assist gas to be jetted toward the irradiation portion of the laser. Therefore, there is a problem in that the cutting end portion of each piece of the cut glass sheet is liable to have a defective shape.

Specifically, for example, when the output power of the laser is high, the amount of molten glass generated by melting the glass sheet through heating with the laser becomes excessive. Thus, as illustrated in FIG. 6, the thickness of a cutting end portion Ga rounded due to an action of surface tension becomes larger than the thickness of the other part of a glass sheet G, with the result that a front surface Gaa and a back surface Gab of the cutting end portion Ga are formed in a projected state (in the following description, this defective shape of the cutting end portion is referred to as "lump").

Further, such a lump is also formed similarly when a beam mode of the laser to be radiated to the glass sheet inevitably deteriorates. In general, the laser is converged through, for example, a lens, and the front surface of the glass sheet is irradiated with the laser so that the focal point thereof is positioned at a predetermined position with respect to the front surface. In this case, when the beam mode inevitably deteriorates or the position of the focal point extremely differs from the above-mentioned predetermined position due to, for example, deformation of an optical element, the area of the position to which the laser is radiated and the energy density thereof are out of the respective proper ranges, with the result that the amount of molten glass becomes excessive. Consequently, as described above, a lump is formed similarly as in the case where the output power of the laser is high.

Further, when the jetting pressure of the assist gas is high, the glass sheet is unnecessarily pressed more strongly due to the pressure of the gas, with the result that, as illustrated in FIG. 7, the cutting end portion Ga is formed in a state in which the cutting end portion Ga droops downward in comparison to the other part (in the following description, this defective shape of the cutting end portion is referred to as "droop"). In this case, the droop is liable to be formed particularly when the glass sheet to be cut is thin.

Note that, in order to prevent the generation of the droop, it is conceived that the removal of the molten glass is carried out without using the assist gas. In this case, moisture and volatile components in glass or energy generated when the glass itself vaporizes and swells serve as a driving force to remove the molten glass. With this, the molten glass is removed. However, in this case, even when the glass sheet is cut so that the focal point of the laser falls within the range of the above-mentioned predetermined position, the front and back surfaces of the cutting end portion of each piece of the cut glass sheet are formed into a slightly projected defective shape in comparison to the other part.

The present invention has been made in view of the above-mentioned circumstances, and a technical object of the present invention is to form, when a glass sheet is cut by a laser fusing method, a cutting end portion of each piece of the cut glass sheet into a satisfactory shape with no lump and droop.

Solution to Problem

According to one embodiment of the present invention, which is devised to achieve the above-mentioned object, there is provided a laser fusing method for a glass sheet, comprising: cutting the glass sheet by irradiating the glass sheet with a laser from a front surface side thereof along a preset cutting line extending in a surface direction of the glass sheet; and jetting a shaping gas so as to form a flow along at least one of the front surface and a back surface of the glass sheet, the shaping gas passing through an irradiation portion of the laser.

According to such a method, in a cutting end portion of the glass sheet, which is sequentially formed at the irradiation portion of the laser, molten glass is to be rounded due to an action of the surface tension thereof along with the irradiation of the laser. In this case, even if a projection is to be formed on the front surface side of the cutting end portion, when the shaping gas is jetted so as to form the flow along the front surface of the glass sheet, a force to push out the projection in the surface direction of the glass sheet acts on the projection due to the pressure of the shaping gas. In addition, an atmospheric pressure is lower on the front surface side of the cutting end portion than on the back surface side thereof because the shaping gas passes through the front surface side. Thus, even if a projection is to be formed on the back surface side of the cutting end portion, a force to push the projection from the back surface side under the higher atmospheric pressure into the front surface side under the lower atmospheric pressure acts on the projection. The actions of these two forces flatten both the front and back surfaces of the cutting end portion so that formation of the projection is prevented. As a result, it is possible to avoid such a situation that the cutting end portion is formed into a defective shape, such as formation of a lump, due to the excessive amount of the molten glass. Further, the jetted shaping gas forms the flow along the front surface of the glass sheet and passes through the irradiation portion of the laser, and hence the cutting end portion is not strongly pressed due to the pressure of the shaping gas from the front surface side toward the back surface side. Thus, it is possible to avoid the formation of a droop. Besides, if the assist gas is jetted toward the irradiation portion of the laser, even when a droop is to be formed at the cutting end portion due to the pressure of the assist gas, the above-mentioned force to push the projection from the back surface side into the front surface side also acts on the droop. Thus, also in this case, the formation of a droop is adequately avoided. Therefore, according to the method of the present invention, when the glass sheet is cut by the laser fusing method, the cutting end portion of each piece of the cut glass sheet can be formed into a satisfactory shape with no lump and droop. Note that, when the shaping gas is jetted so as to form the flow along the back surface of the glass sheet, the force to push out, in the surface direction of the glass sheet, the projection to be formed on the back surface side of the cutting end portion acts on the projection. Further, the atmospheric pressure is lower on the back surface side than on the front surface side, and hence the projection to be formed on the front surface side of the cutting end portion is pushed into the back surface side under the lower atmospheric pressure from the front surface side under the higher atmospheric pressure. In view of the above, the same effect can also be obtained in this case as in the above-mentioned case in which the shaping gas is jetted so as to form the flow along the front surface of the glass sheet. Moreover, when the shaping gas is jetted so as to form each of the flows along both the front surface of the glass sheet and the back surface thereof, the same effect can also be obtained. In this case, it is preferred that the shaping gas to be jetted on the back surface side among the front and back surfaces of the glass sheet be jetted at a lower flow rate when passing through the cutting end portion than the shaping gas to be jetted on the front surface side. As a result, a state in which the atmospheric pressure on the back surface side is higher than that on the front surface side is maintained, and hence it is possible to eliminate the fear of the loss of the action of pushing the projection to be formed at the back surface of the cutting end portion into the front surface side from the back surface side.

In the above-mentioned method, it is preferred that the shaping gas form only a flow along the front surface of the glass sheet.

In general, the glass sheet is supported by processing stages under a state in which the back surface of the glass sheet comes into contact with the processing stages. Thus, the processing stages are present in the vicinity of the back surface of the glass sheet in the irradiation portion of the laser. When the shaping gas forms the flow along the back surface of the glass sheet, the processing stages may disturb the flow of the shaping gas, with the result that the effect of forming the cutting end portion into a satisfactory shape is reduced in some cases. Therefore, it is more preferred that the shaping gas form only the flow along the front surface of the glass sheet.

In the above-mentioned method, it is preferred that a jetting direction of the shaping gas be parallel to the front surface and the back surface of the glass sheet.

As a result, it is possible to prevent the occurrence of such a situation that the flow rate of the jetted shaping gas is reduced due to the impingement of the shaping gas against the glass sheet, and to therefore increase the flow rate of the shaping gas passing through the cutting end portion to the extent possible. Further, as the flow rate of the shaping gas passing through the cutting end portion is higher, the pressure of the shaping gas applied to the projection to be formed on the front surface side becomes larger and a difference in atmospheric pressure between the front surface side and the back surface side becomes larger. Thus, for example, when the shaping gas forms the flow along the front surface among the front and back surfaces of the glass sheet, it is possible to more satisfactorily express the action of pushing out, in the surface direction of the glass sheet, the projection to be formed on the front surface side and the action of pushing, from the back surface side into the front surface side, the projection to be formed on the back surface side.

It is preferred that the above-mentioned method further comprise providing a gas jetting member having a jetting port for jetting the shaping gas, and that the jetting port have a shape that is wide in a direction parallel to the front surface and the back surface of the glass sheet.

As a result, the jetted shaping gas spreads over a wide range of the cutting end portion in conformity with the shape of the jetting port. Thus, it is possible to more stably prevent the formation of the projection on the cutting end portion.

In the above-mentioned method, it is preferred that the glass sheet have a thickness of 500 μm or less.

That is, in the related-art method, when the glass sheet has the thickness of 500 μm or less, it is difficult to reduce the generation of, in particular, a droop in the cutting end portion thereof, but according to the method of the present invention, even when such a thin glass sheet is used, the generation of a droop can be reduced sufficiently.

It is preferred that the above-mentioned method further comprise jetting an assist gas toward the irradiation portion of the laser in a direction oblique to the front surface of the glass sheet.

As a result, the molten glass generated by melting the glass sheet through heating with the laser can be scattered and removed due to the pressure of the assist gas, and hence the molten glass can be removed more quickly and more smoothly. Further, the assist gas is jetted to the irradiation portion in the direction oblique to the front surface of the glass sheet, and hence the cutting end portion of the glass sheet is prevented from being strongly pressed due to the pressure of the assist gas from the front surface side to the back surface side. Thus, in combination of the above-mentioned action obtained by jetting of the shaping gas, it is also possible to prevent the occurrence of such a situation that a droop is formed in the cutting end portion.

It is preferred that the above-mentioned method further comprise: converging the laser through a lens so as to irradiate the glass sheet with the laser; and jetting a gas along an irradiation direction of the laser.

As a result, the occurrence of such a situation that the scattered dross adheres to the lens can be prevented to the extent possible due to the pressure of the gas jetted along the irradiation direction of the laser.

In the above-mentioned method, it is preferred that an advancing direction of the cutting of the glass sheet and a direction of the shaping gas passing through the irradiation portion of the laser be crossed, and that one of both pieces of the cut glass sheet, which is positioned at a jetting source side of the shaping gas, be selected as a product, and another of both the pieces of the cut glass sheet, which is positioned at a jetting destination side of the shaping gas, be selected as a non-product.

That is, when the piece of the glass sheet positioned at the jetting source side of the shaping gas and the piece of the glass sheet positioned at the jetting destination side of the shaping gas are compared regarding which has a larger effect of preventing the formation of the projection on the cutting end portion, a larger effect can be obtained by the piece of the glass sheet positioned at the jetting source side. In addition, dross generated when the glass sheet is cut tends to be scattered toward the jetting destination side of the shaping gas, and hence the dross is difficult to adhere to the cutting end portion of the piece of the glass sheet positioned at the jetting source side. Therefore, when the piece of the cut glass sheet positioned at the jetting source side of the shaping gas is selected as a product, the quality of the product can be improved.

Advantageous Effects of Invention

As described above, according to the one embodiment of the present invention, the shaping gas jetted so as to form the flow along the at least one of the front and back surfaces of the glass sheet passes through the irradiation portion of the laser, and hence when the glass sheet is cut by the laser fusing method, the cutting end portion of each piece of the cut glass sheet can be formed into a satisfactory shape with no lump and droop.

DESCRIPTION OF EMBODIMENTS

Embodiments of the present invention are described below with reference to the attached drawings. Note that, the embodiments are described by taking as an example a case in which a glass sheet placed transversely is cut along a preset cutting line by a laser fusing method so that the cut glass sheet is divided into a product portion as a product and a non-product portion as a non-product (waste).

Figure 1:
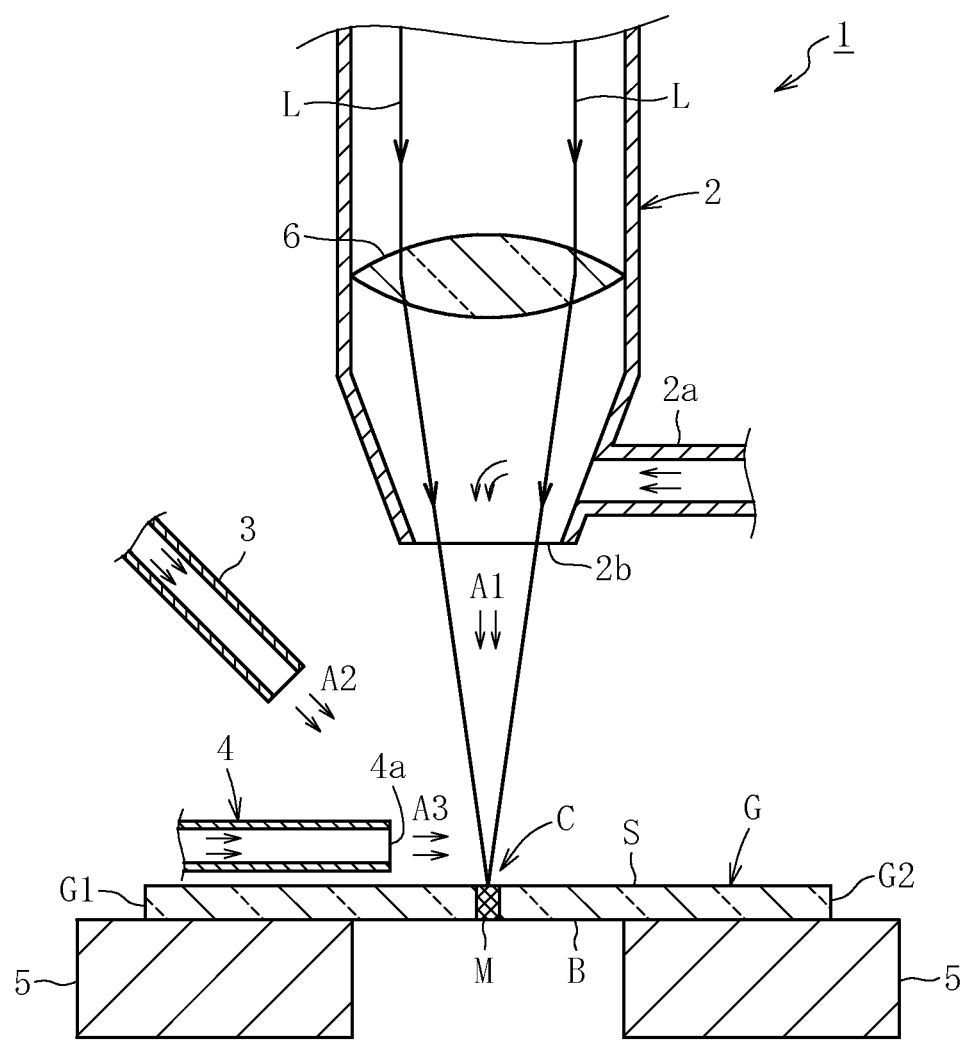
FIG. 1 is a vertical sectional front view illustrating a laser fusing apparatus to be used for a laser fusing method according to an embodiment of the present invention.
Figure 2:
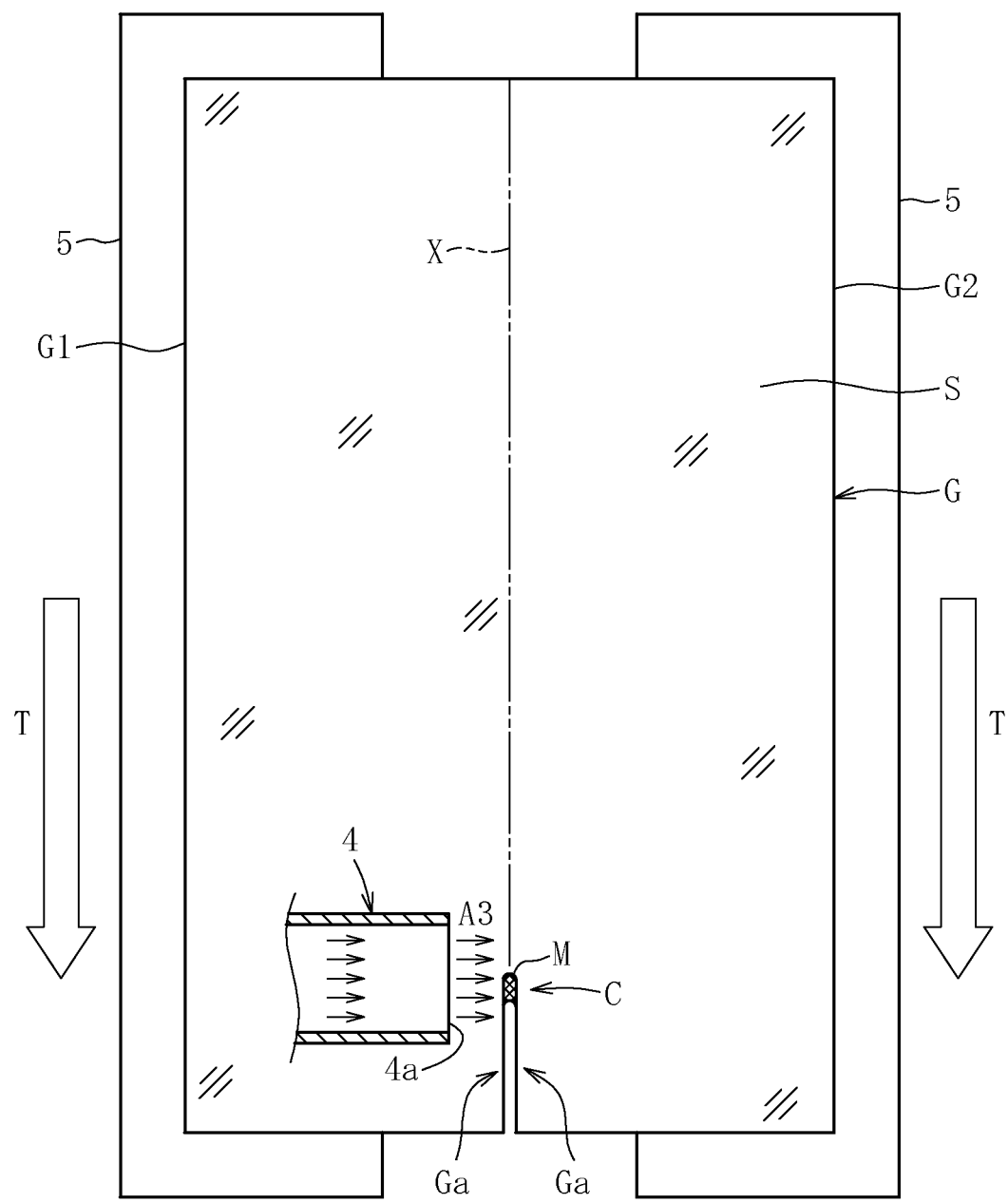
FIG. 2 is a partial cross-sectional plan view illustrating the laser fusing apparatus to be used for the laser fusing method according to the embodiment of the present invention.

FIG. 1 and FIG. 2 are a vertical sectional front view and a partial cross-sectional plan view each illustrating a laser fusing apparatus to be used for a laser fusing method for a glass sheet according to an embodiment of the present invention. As illustrated in FIG. 1 and FIG. 2, a laser fusing apparatus 1 comprises, as main components, processing stages 5 for placing a glass sheet G thereon, a laser irradiator 2 for irradiating a front surface S of the glass sheet G with a laser L, an assist gas jetting nozzle 3 for jetting an assist gas A2 for scattering molten glass M generated by melting the glass sheet G through heating with the laser L, and a shaping gas jetting nozzle 4 serving as a gas jetting member for jetting a shaping gas A3 along the front surface S of the glass sheet G.

The laser irradiator 2 is installed at a fixed position and has a cylindrical proximal end portion and a mortar-like distal end portion. A lens 6 is mounted on an inner circumference wall of the proximal end portion, for converging the laser L emitted from a laser oscillator (not shown) to irradiate the front surface S of the glass sheet G with the laser L. Further, a gas introducing pipe 2a is coupled to the distal end portion, for introducing a gas A1 to be jetted along an irradiation direction of the laser L into the inside of the laser irradiator 2, and a circular irradiation and jetting port 2b, through which the laser L and the gas A1 are radiated and jetted, is formed at the distal end portion.

The assist gas jetting nozzle 3 is installed at a fixed position as in the laser irradiator 2 so as to have a posture oblique to the front surface S of the glass sheet G. The assist gas jetting nozzle 3 has a cylindrical shape so that the assist gas A2 compressed in a gas compressor (for example, air compressor) (not shown) passes through the inside of the assist gas jetting nozzle 3 and is jetted toward an irradiation portion C of the laser L.

The shaping gas jetting nozzle 4 is installed at a fixed position on the front surface S side as in the laser irradiator 2 and the assist gas jetting nozzle 3 so as to have a posture parallel to the front surface S of the glass sheet G in a direction perpendicular to a preset cutting line X extending in a surface direction of the glass sheet G. The cross-section of the shaping gas jetting nozzle 4 and a jetting port 4a formed at a distal end thereof have a substantially rectangular shape, and the jetting port 4a is wide in a direction along the preset cutting line X. The shaping gas A3 compressed in the gas compressor (not shown) passes through the inside of the shaping gas jetting nozzle 4 and is jetted from the jetting port 4a in parallel to the front surface S of the glass sheet G. Further, the shaping gas A3 is jetted from the side of a piece of the cut glass sheet G as a product portion G1 toward the side of a piece of the cut glass sheet G as a non-product portion G2.

The processing stages 5 are installed in pairs so as to be parallel to each other across the preset cutting line X.

Further, both the processing stages 5 are movable in synchronization with each other in a direction T (direction parallel to the preset cutting line X) illustrated in FIG. 2 under a state in which the glass sheet G is placed on the processing stages 5.

As described above, in the laser fusing apparatus 1, the laser irradiator 2 continuously irradiates the front surface S of the glass sheet with the laser L along the preset cutting line X as the processing stages 5, on which the glass sheet G is placed, are moved in the direction T. Then, the assist gas A2 jetted from the assist gas jetting nozzle 3 blows off and scatters the molten glass M generated by melting the glass sheet G at the irradiation portion C of the laser L, to thereby remove the molten glass M. After that, the shaping gas A3 jetted from the shaping gas jetting nozzle 4 passes through a cutting end portion Ga, which is sequentially formed at the glass sheet G along with the removal of the molten glass M, along the front surface S of the glass sheet G so as to be perpendicular to an advancing direction of the cutting of the glass sheet G. Further, dross scattered when the molten glass M is removed is prevented from adhering to the lens 6 with the pressure of the gas A1 jetted from the laser irradiator 2.

Herein, the jetting pressures of the gas A1, the assist gas A2, and the shaping gas A3 are preferably 0.00 to 0.02 MPa, 0.00 to 0.25 MPa, and 0.01 to 1.0 MPa, respectively. Further, the separation distance between the jetting port 4a formed at the shaping gas jetting nozzle 4 and the preset cutting line X is preferably 1 to 30 mm, more preferably 1 to 10 mm. Besides, the angle formed by the jetting direction of the assist gas A2 and the front surface S of the glass sheet G is preferably 25 to 60°.

Now, an action of the laser fusing method for a glass sheet using the above-mentioned laser fusing apparatus 1 is described with reference to the attached drawings. Note that, one of both the pieces of the cut glass sheet as the non-product portion is omitted from the drawings for illustrating the action.

When the molten glass M generated by melting the glass sheet G at the irradiation portion C of the laser L is blown off and removed due to the pressure of the assist gas A2, the cutting end portion Ga is sequentially formed at the glass sheet G. In this case, when the output power of the laser L is high or when the beam mode of the laser L inevitably deteriorates, the amount of the molten glass M generated by melting the glass sheet G becomes excessive.

Figure 3A:
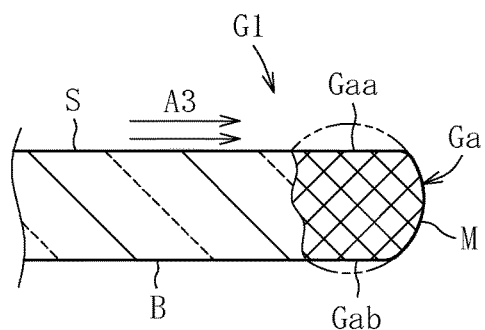
FIG. 3a is a side sectional view illustrating an action of the laser fusing method according to the embodiment of the present invention.
Figure 3B:
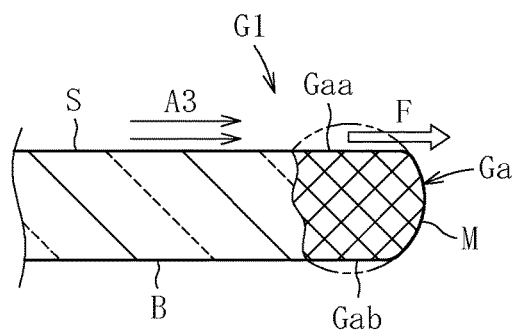
FIG. 3b is a side sectional view illustrating the action of the laser fusing method according to the embodiment of the present invention.

Thus, as indicated by the two-dot chain line of FIG. 3a, the molten glass M is to be rounded due to an action of the surface tension thereof and a front surface Gaa and a back surface Gab of the cutting end portion Ga are to be formed in a projected state. However, as illustrated in FIG. 3b, a force F to push out a projection, which is to be formed on the front surface Gaa, in the surface direction of the glass sheet G (product portion G1) acts on the projection due to the pressure of the shaping gas A3.

Figure 3C:
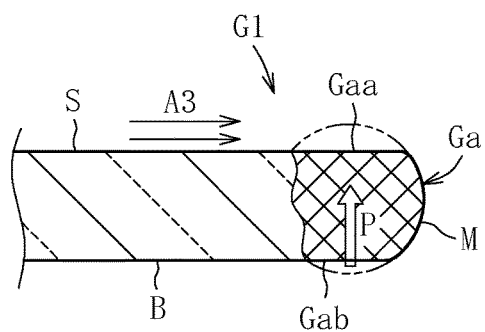
FIG. 3c is a side sectional view illustrating the action of the laser fusing method according to the embodiment of the present invention.
Figure 3D:
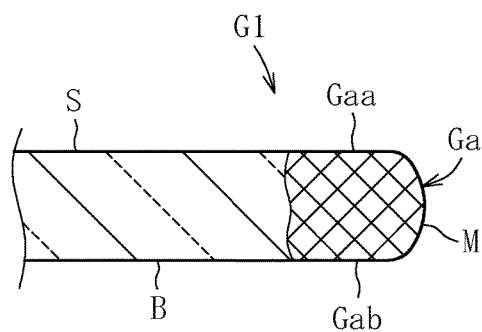
FIG. 3d is a side sectional view illustrating the action of the laser fusing method according to the embodiment of the present invention.

In addition, an atmospheric pressure is lower on the front surface Gaa side of the cutting end portion Ga than on the back surface Gab side thereof because the shaping gas A3 passes through the front surface Gaa side. Thus, as illustrated in FIG. 3c, a force P to push a projection, which is to be formed on the back surface Gab, from the back surface Gab side under the higher atmospheric pressure into the front surface Gaa side under the lower atmospheric pressure acts on the projection. These two forces F and P flatten both the front and back surfaces Gaa and Gab of the cutting end portion Ga so that, as illustrated in FIG. 3d, formation of the projection is prevented.

Further, when these actions are expressed, the shaping gas A3 forms a flow along the front surface S of the glass sheet G, and hence it is possible to avoid such a situation that the flow of the shaping gas A3 is disturbed by the processing stages 5. Besides, the shaping gas A3 is jetted in parallel to the front surface S of the glass sheet G, and hence the occurrence of such a situation that the flow rate of the jetted shaping gas A3 is reduced due to the impingement of the shaping gas A3 against the glass sheet G can be prevented to the extent possible. In addition, as the flow rate of the shaping gas A3 passing through the cutting end portion Ga is higher, the pressure of the shaping gas A3 applied to the projection to be formed on the front surface Gaa side becomes larger and a difference in atmospheric pressure between the front surface Gaa side and the back surface Gab side becomes larger. Thus, the action of pushing out, in the surface direction, the projection to be formed on the front surface Gaa of the cutting end portion Ga and the action of pushing, from the back surface Gab side into the front surface Gaa side, the projection to be formed on the back surface Gab are expressed satisfactorily.

Moreover, the jetting port 4a formed in the shaping gas jetting nozzle 4 is wide in the direction along the front surface S of the glass sheet G, and hence the jetted shaping gas A3 spreads over a wide range of the cutting end portion Ga in conformity with the shape of the jetting port 4a. Thus, it is possible to more stably prevent the formation of the projection on the cutting end portion Ga.

Further, the assist gas A2 is jetted toward the irradiation portion C of the laser L, and hence the molten glass M generated by melting the glass sheet G at the irradiation portion C can be scattered and removed due to the pressure of the assist gas A2. As a result, the molten glass M can be removed more quickly and more smoothly.

As a result, it is possible to avoid formation of the defective shape of the cutting end portion Ga, such as formation of a lump. In addition, the jetted shaping gas A3 passes through the cutting end portion Ga along the front surface S of the glass sheet G, and hence the cutting end portion Ga is also prevented from being strongly pressed due to the shaping gas A3 from the front surface Gaa side to the back surface Gab side. Thus, a droop is also prevented from being formed in the cutting end portion Ga due to the shaping gas A3.

Besides, the fear of the formation of a droop in the cutting end portion Ga due to the pressure of the assist gas A2 is also adequately eliminated as described below. That is, even if a droop is to be formed in the cutting end portion Ga due to the pressure of the assist gas A2, the above-mentioned force P to push the projection from the back surface Gab side into the front surface Gaa side also acts on the droop. Thus, the formation of a droop is adequately avoided.

Further, dross generated when the glass sheet G is cut tends to be scattered toward the jetting destination side of the shaping gas A3. Therefore, the dross is difficult to adhere to the cutting end portion Ga of the product portion G1 of the cut glass sheets G, which is positioned at the jetting source side of the shaping gas A3, resulting in high quality of the product portion G1.

In addition, in the related-art method, it is difficult to cut a thin glass sheet having a thickness of 500 μm or less while reducing the generation of, in particular, a droop in the cutting end portion Ga, but according to the laser fusing method of this embodiment, it is possible to cut such a thin glass sheet without formation of a droop in the cutting end portion Ga. Note that, the thickness of the glass sheet G to be cut is more preferably 300 μm or less, most preferably 200 μm or less.

Figure 4:
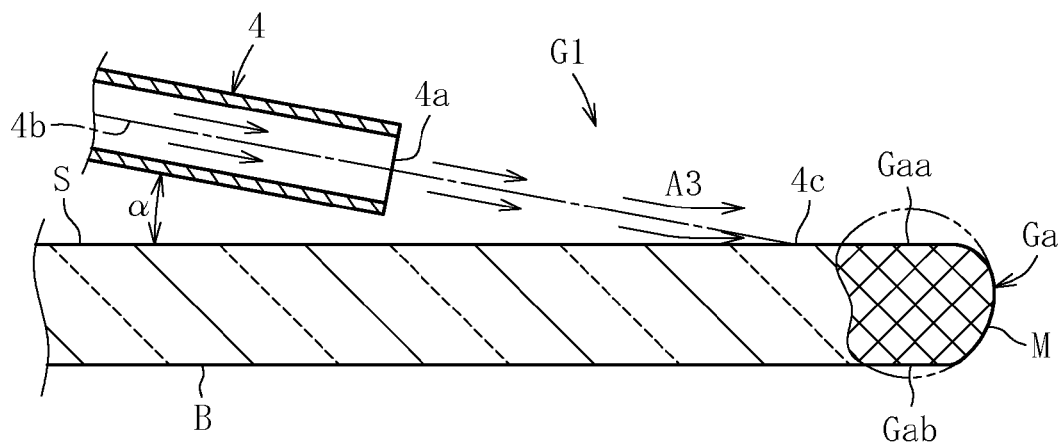
FIG. 4 is a side sectional view illustrating a laser fusing method according to another embodiment of the present invention.

Herein, the laser fusing method for a glass sheet according to the present invention is not limited to the structure described in the above-mentioned embodiment. For example, the above-mentioned embodiment provides the structure that the advancing direction of the cutting is perpendicular to the direction of the shaping gas passing through the irradiation portion of the laser. However, these directions may simply cross each other without being perpendicular to each other, or may be parallel to each other. That is, the shaping gas may be jetted in any direction as long as the jetted shaping gas passes though the irradiation portion of the laser along the front surface of the glass sheet. Further, the shaping gas is not necessarily jetted in parallel to the front surface of the glass sheet. As illustrated in FIG. 4, the shaping gas may be jetted in a direction oblique to the front surface S of the glass sheet G. Note that, in this case, an angle α formed by the jetting direction of the shaping gas and the front surface S of the glass sheet G is preferably 0 to 25°, more preferably 0 to 15°, most preferably 0 to 5°. Further, in this case, when a point at which a center line 4b of the shaping gas jetting nozzle 4 intersects with the front surface S of the glass sheet G is referred to as an intersection 4c, the distance between the intersection 4c and the irradiation portion C of the laser L is preferably 1 to 30 mm, more preferably 2 to 10 mm, most preferably 2 to 5 mm.

Figure 5:
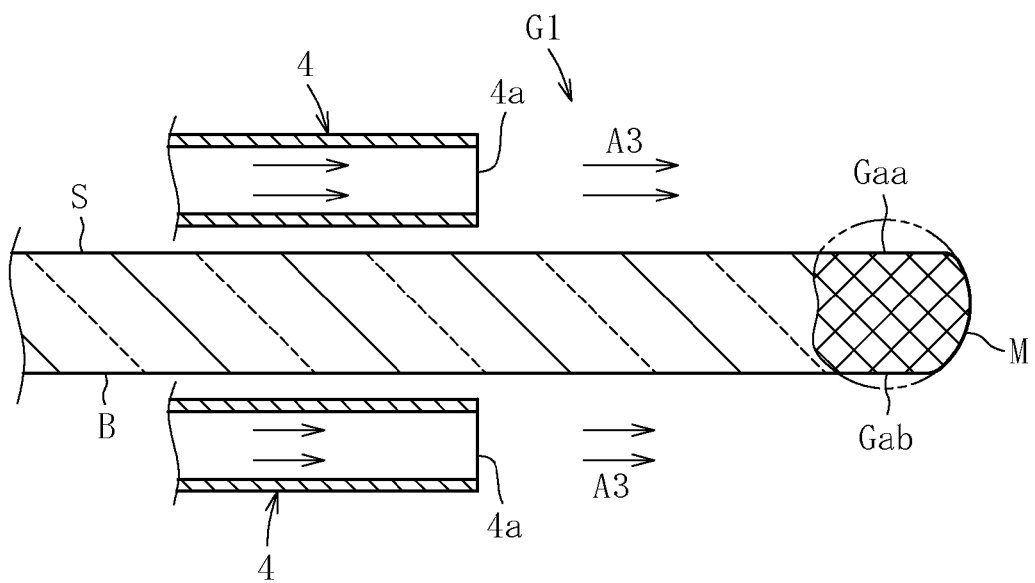
FIG. 5 is a side sectional view illustrating a laser fusing method according to another embodiment of the present invention.
Figure 6:
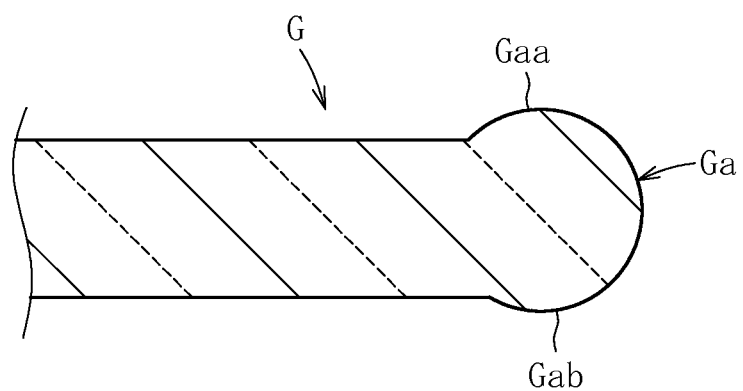
FIG. 6 is a side sectional view illustrating a shape of a defectively formed cutting end portion.
Figure 7:
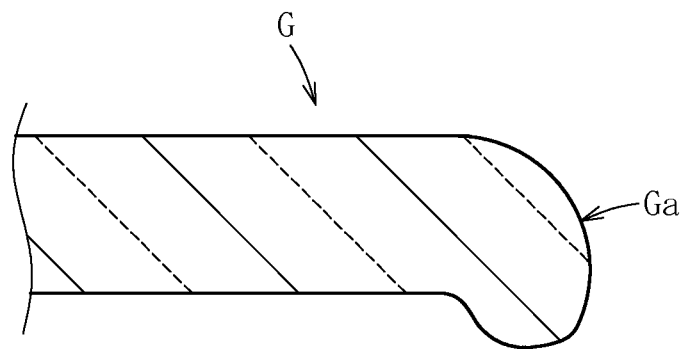
FIG. 7 is a side sectional view illustrating a shape of a defectively formed cutting end portion.

Moreover, the shaping gas may be jetted along both the front and back surfaces of the glass sheet. That is, in the above-mentioned embodiment, the shaping gas is jetted so as to pass through only the front surface side of the irradiation portion of the laser along the front surface of the glass sheet, but as illustrated in FIG. 5, the shaping gas A3 may be jetted not only on the front surface Gaa side of the cutting end portion Ga but also on the back surface Gab side thereof. In this case, it is preferred that the shaping gas A3 to be jetted on the back surface Gab side be jetted at a lower flow rate when passing through the cutting end portion Ga than the shaping gas A3 to be jetted on the front surface Gaa side. As a result, a state in which the atmospheric pressure on the back surface Gab side is higher than that on the front surface Gaa side is maintained, and hence it is possible to eliminate the fear of the loss of the action of pushing the projection to be formed at the back surface Gab into the front surface Gaa side from the back surface Gab side. Note that, also in the case of jetting the shaping gas A3 so as to pass through the back surface Gab, the shaping gas A3 may be jetted in a direction oblique to a back surface B of the glass sheet G. Alternatively, the shaping gas may be jetted so as to form only a flow along the back surface of the glass sheet. Also, in this case, it is possible to obtain the same effect as that in the case of forming the flow along the front surface of the glass sheet.

In addition, the above-mentioned embodiment provides the structure that the assist gas is jetted so as to scatter and remove the molten glass, but the molten glass may be removed without jetting the assist gas. In this case, moisture and volatile components in glass or energy generated when the glass itself vaporizes and swells serve as a driving force to remove the molten glass. With this, the molten glass is scattered and removed.

Further, in the above-mentioned embodiment, the shape of the jetting port formed in the shaping gas jetting nozzle is rectangular, but the shape is not limited to the rectangular shape and a jetting port having any kind of shape may be formed. However, the jetting port is preferably shaped so that the shaping gas jetted from the jetting port spreads over a wide range of the cutting end portion. Examples of such a shape comprise an oval shape having a major axis in the direction parallel to the front surface of the glass sheet.

Moreover, the above-mentioned embodiment provides a mode that the glass sheet placed on the processing stages is fused, but, for example, there may be adopted a mode that a band-like glass ribbon formed by an overflow method or a float method is continuously fused. Alternatively, for example, there may be adopted a mode that a glass roll obtained by rolling a glass ribbon into a roll shape is used to carry out fusing by roll-to-roll processing (mode that a glass ribbon is unrolled from a glass roll to be subjected to predetermined processing, and then the processed glass ribbon is again rolled into a glass roll).

EXAMPLES

As examples of the present invention, under each of the following two conditions, the glass sheet was cut by the laser fusing method and the quality of the shape of the cutting end portion of the cut glass sheet was examined.

The following table shows each cutting condition under which the glass sheet was cut. Note that, in the item "laser medium" of the following table, each of the parenthesized values refers to a wavelength of the laser. Further, the "conveyance speed of glass sheet" refers to a speed at which the glass sheet moves relative to the laser irradiator, the assist gas jetting nozzle, and the shaping gas jetting nozzle each fixed at a stationary point. Besides, the "jetting angle of assist gas" and the "jetting angle of shaping gas" each refer to an oblique angle of each gas to be jetted with respect to the front surface of the glass sheet. In addition, the entry "none" in some items of the following table shows that no assist gas or shaping gas was jetted.

TABLE 1

|  | Example 1 | Example 2 |
|---|---|---|
| Glass thickness [μm] | 100 | 100 |
| Laser medium | $CO_2$ (10.6 μm) | $CO_2$ (10.6 μm) |
| Laser output power [W] | 41 | 12 |
| Lens | 2.5" $Z_nS_e$ | 2.5" $Z_nS_e$ |
| Conveyance speed of glass sheet [mm/s] | 100 | 20 |
| Jetting pressure of assist gas [MPa] | None | None |
| Jetting angle of assist gas [°] | None | None |
| Area of assist gas jetting port [mm$^2$] | None | None |
| Jetting pressure of shaping gas [MPa] | 0.4 | 0.1 |
| Jetting angle of shaping gas [°] | 0 | 0 |
| Area of shaping gas jetting port [mm$^2$] | 10 | 10 |

After the glass sheet was cut under each of the conditions shown in the above-mentioned table, the quality of the shape of the cutting end portion of the cut glass sheet was examined. As a result, it was confirmed in both Examples 1 and 2 that the cutting end portion was formed into a substantially semicircular satisfactory shape. Herein, it is presumed that the reason why the cutting end portion was formed into a satisfactory shape under each of these conditions is that the jetted shaping gas passed through the cutting end portion (irradiation portion of the laser) sequentially formed in the glass sheet, thereby being able to prevent the formation of the projection on the front and back surfaces of the cutting end portion.

REFERENCE SIGNS LIST 1 laser fusing apparatus
2 laser irradiator 2a gas introducing pipe
2b irradiation and jetting port
3 assist gas jetting nozzle
4 shaping gas jetting nozzle
4a jetting port
4b center line
4c intersection
5 processing stage
6 lens
L laser
A1 gas
A2 assist gas
A3 shaping gas
G glass sheet
S front surface of glass sheet
B back surface of glass sheet
Ga cutting end portion of glass sheet
Gaa front surface of cutting end portion
Gab back surface of cutting end portion
G1 product portion
G2 non-product portion
M molten glass
X preset cutting line
T movement direction of processing stage
F force acting on cutting end portion
P force acting on cutting end portion

The invention claimed is:

1. A laser fusing method for a glass sheet, the laser fusing method comprising:
cutting the glass sheet by irradiating the glass sheet with a laser from a front surface side thereof along a preset cutting line extending in a surface direction of the glass sheet; and
jetting a shaping gas so as to form a parallel flow that is parallel along at least one of a front surface of the glass sheet and a back surface of the glass sheet, the parallel flow being in a direction that crosses an advancing direction of the cutting of the glass sheet and through an irradiation portion of the laser, a piece of the glass sheet formed by the cutting, which is positioned at a jetting source side of the shaping gas, to be a product and another piece of the glass sheet formed by the cutting, which is positioned at a jetting destination side of the shaping gas, to be a non-product; and
forming a cutting end portion of the piece of the glass sheet to be the product into a smooth fire polished semi-cylindrical portion over an entire area of the cutting end portion as a result of the cutting and jetting steps.

2. The laser fusing method for a glass sheet according to claim 1, wherein the jetting of the shaping gas forms the parallel flow only along the front surface of the glass sheet.

3. The laser fusing method for a glass sheet according to claim 2, wherein a jetting direction of the shaping gas is parallel to the front surface and the back surface of the glass sheet.

4. The laser fusing method for a glass sheet according to claim 1, wherein a jetting direction of the shaping gas is parallel to the front surface and the back surface of the glass sheet.

5. The laser fusing method for a glass sheet according to claim 1,
wherein the jetting of the shaping gas comprises jetting the shaping gas from a gas jetting member having a jetting port for jetting the shaping gas, and
wherein the jetting port has a shape that is wide in a direction parallel to the front surface and the back surface of the glass sheet.

6. The laser fusing method for a glass sheet according to claim 1, wherein the glass sheet has a thickness of 500 μm or less.

7. The laser fusing method for a glass sheet according to claim 1, further comprising jetting an assist gas toward the irradiation portion of the laser in a direction oblique to the front surface of the glass sheet.

8. The laser fusing method for a glass sheet according to claim 1, further comprising:
converging the laser through a lens so as to irradiate the glass sheet with the laser; and
jetting a gas along an irradiation direction of the laser.

* * * * *